(12) United States Patent
Dave et al.

(10) Patent No.: US 9,781,178 B2
(45) Date of Patent: Oct. 3, 2017

(54) CROWDSOURCED CONTENT PUBLICATION PLATFORM

(71) Applicant: LinkedIn Corporation, Mountain View, CA (US)

(72) Inventors: Nipun Dave, Mountain View, CA (US); Daniel C. Green, Mill Valley, CA (US); Albert Wang, Cupertino, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 123 days.

(21) Appl. No.: 14/791,040

(22) Filed: Jul. 2, 2015

(65) Prior Publication Data
US 2015/0312291 A1    Oct. 29, 2015

Related U.S. Application Data

(63) Continuation of application No. 13/943,375, filed on Jul. 16, 2013, now Pat. No. 9,124,658.

(51) Int. Cl.
*H04L 29/06* (2006.01)
*G06Q 50/00* (2012.01)
*G06Q 10/10* (2012.01)
*G06F 17/24* (2006.01)
*G06F 17/30* (2006.01)

(52) U.S. Cl.
CPC .......... *H04L 65/403* (2013.01); *G06F 17/248* (2013.01); *G06F 17/3053* (2013.01); *G06Q 10/101* (2013.01); *G06Q 50/01* (2013.01)

(58) Field of Classification Search
None
See application file for complete search history.

(56) References Cited

U.S. PATENT DOCUMENTS

| 9,124,658 | B2 | 9/2015 | Dave et al. |
| 2007/0192671 | A1 | 8/2007 | Rufener |
| 2008/0154931 | A1 | 6/2008 | Jacobs et al. |
| 2009/0070426 | A1* | 3/2009 | McCauley ............ G06Q 10/10 709/205 |
| 2010/0251139 | A1 | 9/2010 | Vance et al. |

(Continued)

OTHER PUBLICATIONS

"U.S. Appl. No. 13/943,375, Examiner Interview Summary mailed Oct. 9, 2014", 3 pgs.

(Continued)

*Primary Examiner* — Tuan S Nguyen
(74) *Attorney, Agent, or Firm* — Schwegman Lundberg & Woessner, P.A.

(57) ABSTRACT

A system, computer-readable storage medium, and computer-implemented method for creating a crowdsourced content publication. Layout information defining a layout of elements of a crowdsourced content publication is received. Contribution privilege information identifying a group of users of a social networking service as contributors to the crowdsourced content publication is received. The group of users may belong to a common organization as defined by a social graph maintained by the social networking service. Content criteria information specifying one or more criteria for selection of content included in the crowdsourced content publication is then received. The layout information, contribution privilege information, and content criteria information are then processed to generate a template for the crowdsourced content publication.

20 Claims, 10 Drawing Sheets

(56) References Cited

U.S. PATENT DOCUMENTS

2011/0078017 A1* 3/2011 Lam .................. G06Q 30/02
                                                    705/14.45
2011/0191417 A1   8/2011 Rathod
2012/0110429 A1   5/2012 Tzonis et al.
2013/0047061 A1   2/2013 Soin et al.
2015/0026594 A1   1/2015 Dave et al.

OTHER PUBLICATIONS

"U.S. Appl. No. 13/943,375, Final Office Action mailed Apr. 10, 2014", 15 pgs.
"U.S. Appl. No. 13/943,375, Final Office Action mailed Dec. 31, 2014", 17 pgs.
"U.S. Appl. No. 13/943,375, Non Final Office Action mailed Aug. 14, 2014", 15 pgs.
"U.S. Appl. No. 13/943,375, Non Final Office Action mailed Nov. 7, 2013", 14 pgs.
"U.S. Appl. No. 13/943,375, Notice of Allowance mailed Apr. 24, 2015", 6 pgs.
"U.S. Appl. No. 13/943,375, PTO Response to Rule 312 Communication mailed Jul. 27, 2015", 2 pgs.
"U.S. Appl. No. 13/943,375, Response filed Mar. 31, 2015 to Final Office Action mailed Dec. 31, 2014", 15 pgs.
"U.S. Appl. No. 13/943,375, Response filed Jul. 10, 2014 to Final Office Action mailed Apr. 10, 2014", 12 pgs.
"U.S. Appl. No. 13/943,375, Response filed Nov. 10, 2014 to Non Final Office Action mailed Aug. 14, 2014", 13 pgs.
"U.S. Appl. No. 13/943,375, Response mailed Feb. 5, 2014 to Non Final Office Action filed Nov. 7, 2013", 14 Ppgs.

\* cited by examiner

CROWDSOURCED CONTENT PUBLICATION PLATFORM

RELATED APPLICATIONS

This application is a continuation of U.S. patent application Ser. No. 13/943,375, entitled "CROWDSOURCED CONTENT PUBLICATION PLATFORM," filed Jul. 16, 2013, the benefit of priority of which is claimed hereby, and which is incorporated herein by reference in its entirety.

TECHNICAL FIELD

This patent document pertains generally to data processing systems, and more particularly, but not by way of limitation, to a platform for content development, aggregation, discovery, and delivery.

BACKGROUND

Social networking services allow users to establish social networks among real life friends, colleagues, or acquaintances or other users who share experiences, interests, and activities. Traditional social networking services often provide a means for users to interact over a network (e.g., the Internet), such as email or instant messaging. Social networking services also often provide a means for users to share ideas, pictures, posts, activities, events, and interests with other members of the network. This content may be created by the users themselves or in some instances the content may have been created by another.

In general, these social networks form from the bottom up on a peer to peer basis. The social network starts with users who are early adopters and then eventually the social network grows organically and spreads to a more general audience. However, some social networks are unable to form and grow through this process. For example, large corporations often struggle to build and maintain internal social networks. It is often difficult for such social networks to grow because of the diversity of the members in the network, which often leads to a lack of shared values and interests among such members.

BRIEF DESCRIPTION OF DRAWINGS

Some embodiments are illustrated by way of example and not limitation in the figures of the accompanying drawings in which.

DETAILED DESCRIPTION

Figure 1:
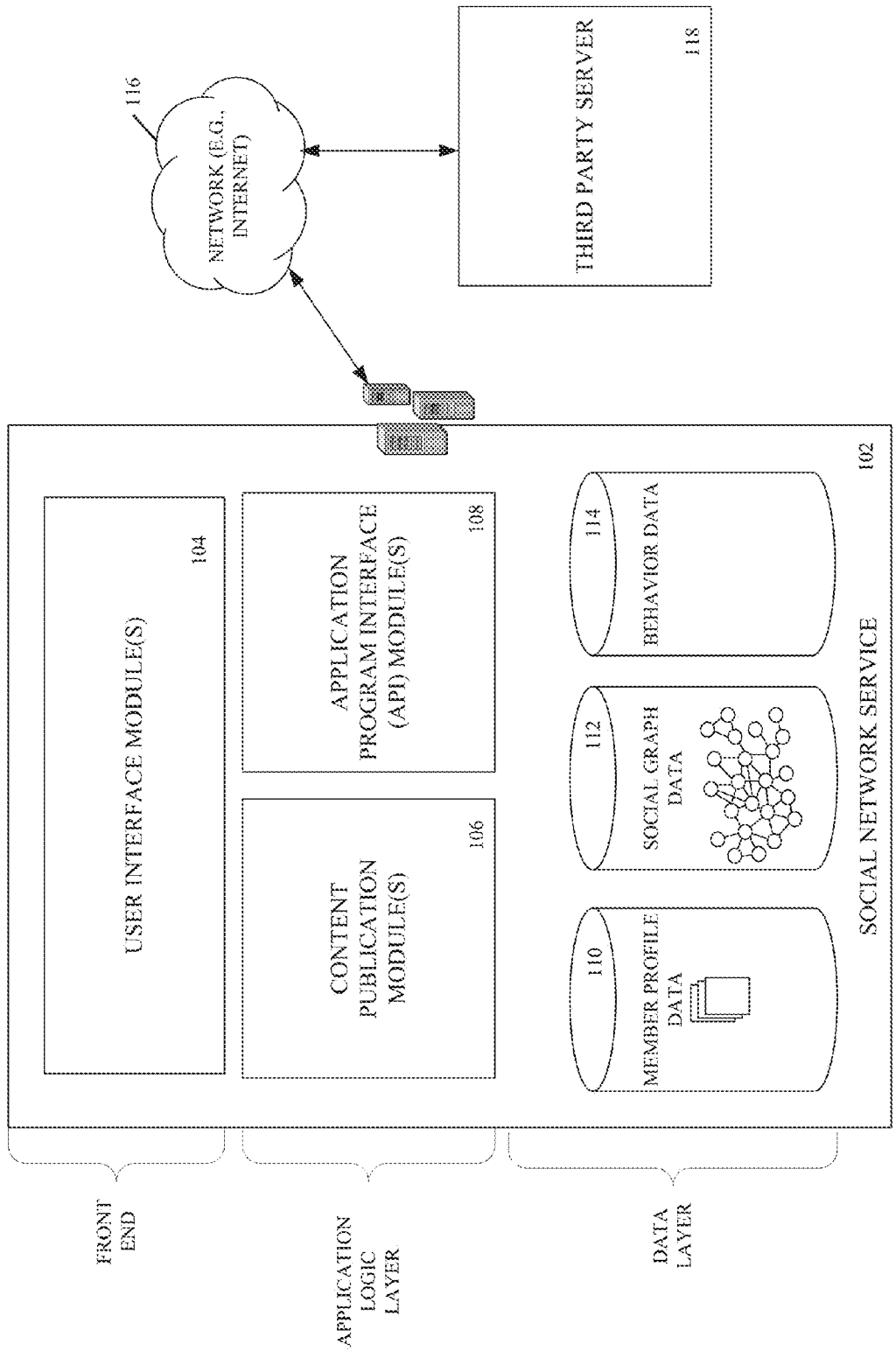
FIG. 1 is a block diagram illustrating various functional components of a social networking system, including a content publication module for publishing crowdsourced content, according to an example embodiment.

The present disclosure describes methods, systems and computer program products for creating a crowdsourced content publication. The crowdsourced content publication may be a publication intended to record, highlight, or commemorate a shared experience between a group or groups of users. For example, the crowdsourced content publication may be a school yearbook including content related to the experience of the students and teachers during the school year. In another example, the crowdsourced content publication may be a company culture book including content related to the culture of the company and the shared experiences of the employees. In yet another example, the crowdsourced content publication may include a number of houses for sale that are represented by a group of connected real estate professionals, and the publication may include housing statistics, rates, comparisons, and insights for that local market. Thus, the crowdsourced content publication system provides a platform for a diversified group of users to come together to create content that may have a variety of uses including talent branding, employee education, shareholder engagement, and the like. In the process of creating such content, new social networks between the diversified contributors to the content may be formed.

Consistent with some embodiments, the creation of a crowdsourced content publication may be provided as a part of a social networking service or as a service on a social network. The members of the social network may be able to initiate the process of creating the crowdsourced content publication and may invite other members to contribute. In some embodiments, each of the contributing members belongs to a common organization or group as defined by a social graph hosted by the social network.

In some embodiments, a user initiating the process of creating the crowdsourced content publication, also referred to as the "administrator," may be able to configure various template configurations settings that specify the layout of each of the pages, sections, topics or other elements that may comprise the subsequently generated publication. The template configuration settings may also specify a number of criteria for the selection of content that is to be included in the publication. Also, in configuring the template configuration settings, the administrator may select multiple other members of the social network to contribute to the publication, and the administrator may also dictate the manner in which each of the other members may contribute to the publication. Once the template configuration information is established by the administrator, a template is created.

Consistent with some embodiments, the members selected to contribute to the crowdsourced content publication may be sent an invitation to contribute. Upon receipt of the invitation, these members may be able to view and edit the template in accordance with the template configuration settings. For example, depending on the contribution privileges of each member, the contributing members may be able to contribute content (e.g., video, images, audio, text, etc.), remove content, rate content or suggest additional members that should be allowed to contribute. In some embodiments, an additional member who has been suggested as a contributor is verified and subsequently sent an invitation to contribute to the crowdsourced content publication.

In some embodiments, certain contributors may be sent a notification related to the contributions of other contributors. The notification may include the contribution information received from each of the other contributes. The notification may also enable contributors to review and edit other contributor's contributions in accordance with the content privilege information.

Consistent with some embodiments, the contribution information (e.g., additional content, content ratings, etc.) received from each of the contributors may be processed and incorporated into the template in accordance with the template configuration settings. The template may then be used to generate the crowdsourced content publication. In some embodiments, generating the crowdsourced content publication may include rendering the template and incorporated contribution information into a fixed electronic format that may be viewed by a web browser. In some embodiments, generating the crowdsourced content publication may include producing the template and incorporated contribution into a physical print format.

System and Environment

FIG. 1 is a block diagram illustrating various functional components of a social network service 102, including a content publication module 106 for publishing crowdsourced content, according to an example embodiment. As shown in FIG. 1, the social network service 102 is generally based on a three-tiered architecture, consisting of a front-end layer, application logic layer, and a data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be supported by a social network system to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such architecture.

As shown in FIG. 1, the front end consists of a user interface module (e.g., a web server) 104, which receives requests from various client-computing devices, and communicates appropriate responses to the requesting client devices. For example, the user interface module(s) 104 may receive requests in the form of Hypertext Transport Protocol (HTTP) requests, or other web-based, application programming interface (API) requests. The user interface module(s) 104 may also be configured to transmit invitations, notifications and reminders related to a crowdsourced content publication to a client device of a user. The client devices (not shown) may be executing conventional web browser applications, or applications that have been developed for a specific platform to include any of a wide variety of mobile devices and operating systems.

As shown in FIG. 1, the data layer includes several databases, including member profile database 110, which stores general information contained on a social network profile, including general contact information, employer information, educational institution information, as well as information concerning various online or offline groups. Member profile database 110 may contain information for member profiles for only a single social network profile or for profiles on several different social networks.

Consistent with some embodiments, when a person initially registers to become a member of a social network service, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, and so on. This information is stored, for example, in the member profile database 110. Member profile database 110 may also contain contact information such as lists of contacts, previous employers, interests, organizational affiliations, as well as personal and professional: addresses, phone numbers and websites.

As shown in FIG. 1, the data layer also includes social graph database 112, which is a particular type of database that uses graph structures with nodes, edges, and properties to represent and store data. Of course, with various alternative embodiments, any number of other entities might be included in the social graph, and as such, various other databases may be used to store data corresponding with other entities.

Once registered, a member of social network service 102 may invite other members, or be invited by other members, to connect via the social network service 102. A "connection" may require a bi-lateral agreement by the members, such that both members acknowledge the establishment of the connection. Similarly, a member may elect to "follow" another member. In contrast to establishing a "connection", the concept of "following" another member typically is a unilateral operation, and at least with some embodiments, does not call for acknowledgement or approval by the member that is being followed. When one member follows another, the member who is following may receive automatic notifications about various activities undertaken by the member being followed. In addition to following another member, a user may elect to follow a company, a topic, a conversation, or some other entity. For purposes of the present disclosure, the term "connection" shall include both the bi-lateral agreement by both members and the unilateral operation of "following". Each of the connections of a user may be included in social graph database 112.

A social network may also provide a broad range of other applications and services that allow members the opportunity to share and receive information, often customized to the interests of the member. For example, a social network service may include a photo sharing application that allows members to upload and share photos with other members. As such, at least with some embodiments, a photograph may be a property or entity included within a social graph. Members of a social network service may be able to self-organize into groups, or interest groups, organized around a subject matter or topic of interest. Accordingly, the data for a group may be stored in social graph database 112. When a member joins a group, his or her membership in the group will be reflected in the social graph data stored in the social graph database 112. With some embodiments, members may subscribe to or join groups affiliated with one or more companies. For instance, with some embodiments, members of the social network service 102 may indicate an affiliation with a company at which they are employed, such that news and events pertaining to the company are automatically communicated to the members. With some embodiments, members may be allowed to subscribe to receive information concerning companies other than the company with which they are employed. Here again, membership in a group, a subscription or following relationship with a company or group, as well as an employment relationship with a company, are all examples of the different types of relationships that may exist between different entities, as defined by the social graph and modeled with the social graph data of the social graph database 112.

Referring again to FIG. 1, the social network service 102 may provide a broad range of applications and services that allow members the opportunity to share and receive information often customized or personalized to the interests of the member. As members interact with various applications, services and content made available via the social network service 102, the member's behavior (e.g., content viewed, links or buttons selected, messages responded to, etc.) may be tracked and information concerning the member's activities and behavior may be logged or stored, for example, as indicated in FIG. 1 by behavior database 114.

As illustrated in FIG. 1, the application layer includes one or more content publication module(s) 106 that provide various crowdsourced content publication services to a plurality of users. For example, the content publication module(s) 106 may allow a user to create a crowdsourced content publication. In some embodiments, the crowdsourced content publication may be a publication commemorating a shared experience with a group of other users, such as a high school yearbook or a company culture book. Consistent with some embodiments, the group of other users may be connected to the user on a social graph. The crowdsourced content publication may be generated based on a template that may include a particular layout of how content is to be organized, what content is to be included, and who may contribute content to the publication. Further details of the modules comprising the content publication module(s) 106 are presented below in reference to FIG. 2. As illustrated in FIG. 1, the application layer may also include a server that includes at least one processing device configured to implement at least the respective content publishing services and processes discussed herein.

As illustrated in FIG. 1, the content publication module(s) 106 may be implemented as a service that operates in conjunction and is integrated with the social network or other online services. However, with various alternative embodiments, the content publication module(s) 106 may be implemented as its own application server module such that it operates as a stand-alone application. With some embodiments, the content publication module(s) 106 may include or have an associated publicly available application program interface (API) modules 108 that enables third-party applications to invoke the functionality of the content publication module(s) 106 over communication network 116.

As illustrated in FIG.1, the application logic layer may include API module(s) 108, which is coupled to and provides programmatic interfaces to one or more content publication module(s) 106. In one embodiment, the API module(s) 108 may obtain information over communication network 116 from a third party server 118 to be stored in databases 110, 112, or 114 and later utilized by one or more content publication module(s) 106.

FIG. 1 also illustrates third party server 118 as having programmatic access to the communication network 116. The third party server 118 may be coupled via an API server to the communication network 116, for example, via wired or wireless interfaces. The communication network 116 may be a LAN, a WAN, the Internet, or other packet-switched data network. Accordingly, a variety of different configurations are expressly contemplated.

In one embodiment, the third party server 118 may, utilizing information retrieved from the communication network 116, support one or more features or functions of the social network service 102 on a website hosted by the third party. The third party website may, for example, be a social network service, a news service, a blog, or other content aggregating service.

Figure 2:
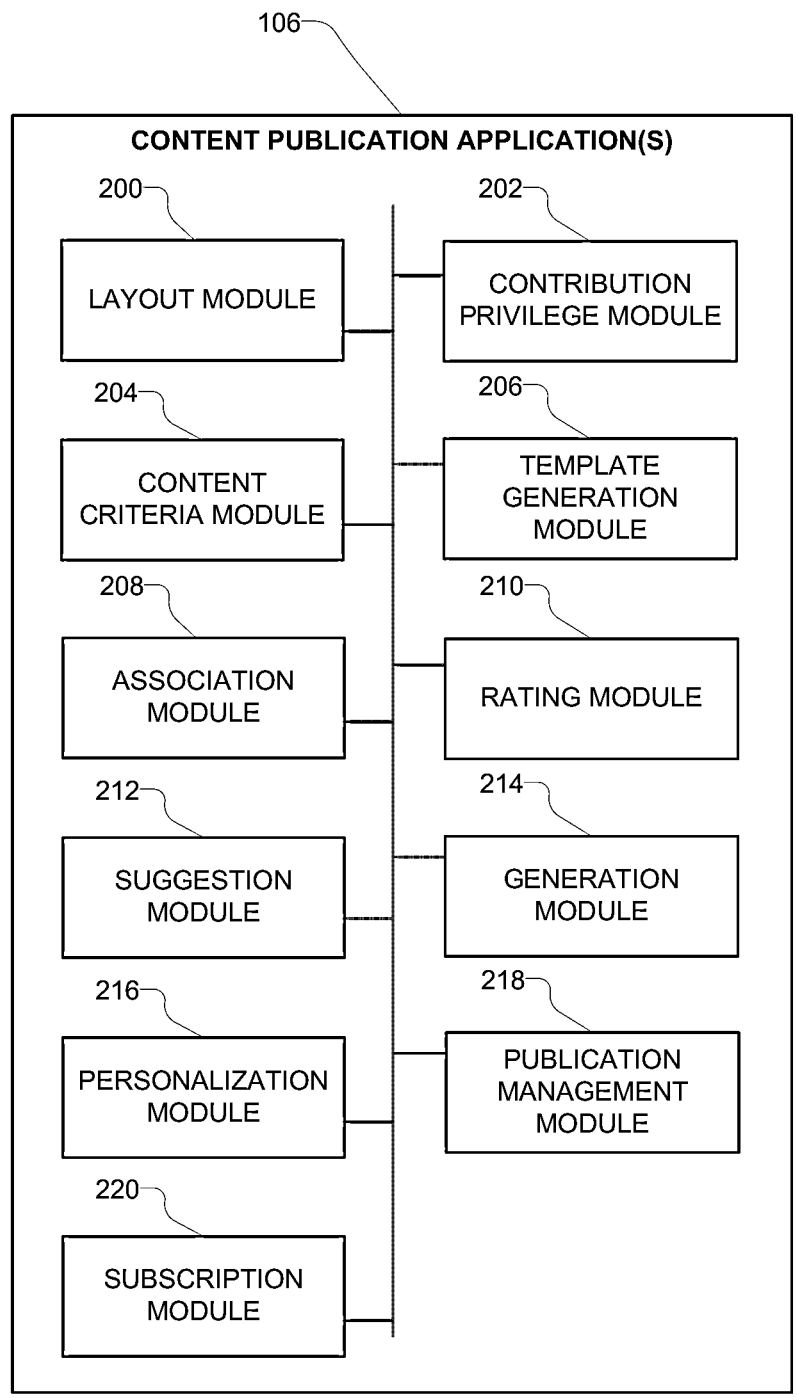
FIG. 2 is a block diagram illustrating various functional modules that are provided as part of the content publication applications, according to an example embodiment.

FIG. 2 is a block diagram illustrating various functional modules that are provided as part of the content publication module(s) 106, according to an example embodiment. The content publication module(s) 106 may be hosted on dedicated or shared sever machines (not shown) that are communicatively coupled to enable communications between server machines. Each of the modules 200-216 are communicatively coupled (e.g., via appropriate interfaces) to each other and to various data sources, so as to allow information to be passed between each of the modules 200-216 or so as to allow each of the modules 200-216 to share and access common data. The various modules of the content publication module(s) 106 may furthermore access one or more of the databases 110-114 illustrated in FIG. 1.

As illustrated in FIG. 2, the content publication module(s) 106 may include one or more layout module 200, which may be a hardware implemented module, software executed by general purpose or special purpose hardware, or instructions stored on a computer readable medium that is operative to facilitate the configuration and layout of various elements that may comprise a crowdsourced content publication. To this end, the layout module 200 may be configured to receive layout information defining the arrangement or layout of elements in the crowdsourced content publication. The layout information may be received from a user via a user interface present on a client device operated by the user. The user initiating the creation of the crowdsourced content publication, also referred to as the administrator, may be prompted to provide the layout information upon initiation of the crowdsourced content creation process. The layout information may, for example, define the size, number, and location of content frames included in a crowdsourced content publication. Each content frame may serve as a place holder for content elements that may eventually be included in the crowdsourced content publication. The layout information may also specify the number, type, and order of each topic, section, and page to be included in a crowdsourced content publication. The size, number and location of each of the content frames may vary from between each topic, each section, each page or combinations thereof.

As illustrated in FIG. 2, the content publication module(s) 106 may include one or more contribution privilege module 202, which may be a hardware implemented module, software executed by general purpose or special purpose hardware, or instructions stored on a computer readable medium that is operative to receive contribution privilege information from the user via the user interface. The contribution privilege information identifies one or more users as contributors to the crowdsourced content publication. In some embodiments, the one or more users are a group of members of a social networking service belonging to a common organization as defined by the social graph hosted by the social networking service.

In some embodiments, the contribution privilege information may include one or more contribution privileges specifying the manner in which the one or more users designated as contributors may contribute to the crowdsourced content publication. For example, the contribution privileges may indicate that a particular user may contribute to an entire section of the publication while indicating that another user may be limited in contribution ability to a single content frame.

In some embodiments, the content privilege information may designate the crowdsourced content publication administrator as the only user with the privilege to contribute to a content frame, a page, or a section. In some embodiments, the content privilege information may indicate that the crowdsourced content publication module(s) 106 is to automatically populate certain frames, pages, sections or topics with content. Consistent with some embodiments, content frames designated as frames to be automatically populated may further be designated as dynamic content frames to be populated with content items personalized for individual users viewing a crowdsourced content publication. For example, a user viewing a particular crowdsourced content publication may be presented with content created by a connection of the user in a frame with such a designation.

In establishing contribution privileges for the crowdsourced content publication, the administrator may be able to set reminders to be automatically transmitted to the contributors at predefined time intervals. The reminders may include a reminder to contribute to the crowdsourced content publication as well as a link to access the crowdsourced content publication template.

The content publication module(s) 106 may also include one or more content criteria module 204. Each content criteria module 204 may be a hardware implemented module, software executed by general purpose or special purpose hardware, or instructions stored on a computer readable medium that is operative to receive content criteria from the user via the user interface. The content criteria may specify one or more criteria for content to be included in a crowdsourced content publication. The criteria may, for example, include one or more sources from which content may be selected (e.g., a particular social network, a particular news service), one or more content types (e.g., video, images, audio, text, etc.), a date or date range in which the content may have been created (e.g., only photos taken during particular year), a location or event to which the content may be associated (e.g., only photos of a particular company event), a particular album or other content collection from which content may be selected, or an individual or group of individuals that must be included in the content.

The content criteria may dictate the criteria for selection of content to be included in a particular content frame, a particular section, or a particular page included in the crowdsourced content publication. In some embodiments, the content criteria may include a set of keywords to be used to perform queries to locate content to be included in the crowdsourced content publication.

Referring again to FIG. 2, the content publication module(s) 106 may include one or more template generation module 206. Each template generation module 206 may be a hardware implemented module, software executed by general purpose or special purpose hardware, or instructions stored on a computer readable medium that is operative to process the layout information, the contribution privilege information, and content criteria (collectively referred to as "template configuration information") to generate a template for the crowdsourced content publication. The template may be rendered in a format such that a user may view and edit elements in the template in accordance with the template configuration information.

In some embodiments, the generation of the template may include retrieving one or more content items from a third party server (e.g., third party server 118) via API and incorporating the content into the appropriate content frame as specified by the content criteria and contribution privilege information. The source and general subject matter of the retrieved content may be specified in the content criteria associated with the particular content frame to which the content is to be included. In some embodiments, the template generation module 206 may generate or obtain a plurality of suggested content based on existing data (e.g., member profile data, social graph data, and behavior data) about the users designated as contributors.

As illustrated in FIG. 2, the content publications module(s) 106 may include one or more association module 208. Each association module 208 may be a hardware implemented module, software executed by general purpose or special purpose hardware, or instructions stored on a computer readable medium that is operative to determine one or more users that may be associated with content received via a user interface to be included in the crowdsourced content publication. The association module 208 may work in conjunction with the contribution privilege module 202 to provide contributors with the ability to tag, associate, or link additional users to existing content or content added by the user.

The association module 208 may be further configured to verify that certain users that are tagged, associated, or linked to content are eligible to contribute to the crowdsourced content publication. The verification of an additional user may include transmitting a request to the administrator of the crowdsourced content publication to confirm that the additional user is actually associated with the content and to confirm that the additional user is allowed to contribute to the content publication. Confirming that the additional user is allowed to contribute to the crowdsourced content publication may necessitate updating the contribution privilege information received by the contribution privilege module 202.

In some embodiments, the association module 208 may employ one of several known facial recognition techniques to verify that an additional user who may be tagged, associated, or linked to a particular content by a contributor is actually associated with the content.

As illustrated in FIG. 2, the content publication module(s) 106 may include one or more rating module 210. Each rating module 210 may be a hardware implemented module, software executed by general purpose or special purpose hardware, or instructions stored on a computer readable medium that is operative to provide users with ability to rate content that is part of the crowdsourced content publication template. The contribution privileges may dictate which users may be able to rate content. Depending on the contribution privilege information, the rating module 210 may allow users to rate the content itself, as well as the placement of content in a particular frame, section, topic or page. In some embodiments, all content distributed on the social network service 102 may be rated for inclusion in the crowdsourced content publication.

The rating module 210 may aggregate ratings submitted by a plurality of users to calculate an overall rating. In some embodiments, the overall rating may be an average, the mean, the median, the mode or some other central or typical rating value.

In some embodiments, the rating module 210 may be configured to track the number of views, comments, shares, and subscriptions corresponding to a particular crowdsourced content publication or portion thereof. These statistics may be used to rank crowdsourced content publications by popularity.

As illustrated in FIG. 2, the content publication module(s) 106 may include one or more suggestions module 212. Each suggestion module 212 may be a hardware implemented module, software executed by general purpose or special purpose hardware, or instructions stored on a computer readable medium that is operative to suggest content for rating or editing to a user designated as a contributor. The suggestion module 212 may surface content to an activity feed of the user on the social network. The user may in turn be able to rate the content or supply other contribution information in accordance with the user's contribution privileges.

The suggestion module 212 may also provide suggestions of crowdsourced content publications that may be of interest to a particular user. The suggested crowdsourced content publications may be based on the popularity of the crowdsourced content publications as determined by the rating module 210. In some embodiments, the suggested crowdsourced content publication is based on the relationship of the user with the contributors to the publication. For example, the suggestion module 212 may suggest a particular crowdsourced content publication to a user based on the user being employed by the same organization as the contributors to the publication.

As illustrated in FIG. 2, the content publication module(s) 106 may include one or more generation module 214. Each generation module 214 may be a hardware implemented module, software executed by general purpose or special purpose hardware, or instructions stored on a computer readable medium that is operative to generate the crowdsourced content publication. The crowdsourced content publication may be generated based on the previously generated template and user contributions added to the template. Users may be able to contribute to the template based on the contribution privilege information. The user contributions may comprise content items, content ratings, edits to content, or added associations to additional users. Each of the contributions may be processed by the generation module 214 and incorporated into the template accordingly.

In some embodiments, the generation module 214 may analyze the overall ratings calculated by the rating module 210 to determine whether certain content items will be ultimately included in the crowdsourced content publication. The generation module 214 may also analyze the overall ratings to determine the configuration and placement of certain content items in the crowdsourced content publication. Consistent with these embodiments, the crowdsourced content publication may be generated such that the content with the highest overall content rating is included in the crowdsourced content publication.

In some embodiments, the generation module 214 may render the content publication in a fixed electronic format configured for display in a web browser or in a specialized application running on a client device. The electronic format is "fixed" in the sense that it is no longer in a format that may be edited. Administrators of crowdsourced content publications may also host the electronic format of the publication on a third party website. In some embodiments, the third party website may contain a link that redirects users to a crowdsourced content publication viewing interface provided by the social network service 102.

Each electronic format of a crowdsourced content publication will be stored and maintained in a database for later access and retrieval. Older publications may be archived as specified by the administrator.

In some embodiments, the generation module 214 may render the content publication in a format to be printed as a physical publication. Both the electronic format and the physical publication format may include one or more identifiers (e.g., bar code or QR code) corresponding to one or more designated contributors of the publication. The electronic format of the crowdsourced content publication may include certain elements that may not be available in the printed version. For example, the electronic format may include hyperlinks or QR codes that, when selected by a user, automatically redirect the applicable web browser to an alternative web site or web page. As another example, the electronic format may have a number of dynamic elements that may change as the user navigates through the publication or that may vary with each viewing experience. To this end, the content publication module(s) 106 may include one or more personalization module 216 to work in conjunction with the generation module 214 to provide dynamic elements.

The personalization module 216 may be a hardware implemented module, software executed by general purpose or special purpose hardware, or instructions stored on a computer readable medium that is operative to provide personalized content elements to users viewing a crowdsourced content publication based on the viewer and the viewer's relationship with the designated contributors. The personalized content may be added to a content frame that has been dedicated as a dynamic element as specified in the content privilege information. The personalization module 216 may select content items in accordance with the content criteria. In some embodiments, the selection of a personalized content element may be based on one or more connections of a user with the publication. For example, the personalization module 216 may surface a particular content element into a content frame designated as a dynamic content frame if the content element is created by a connection of the user.

As illustrated in FIG. 2, the content publication module(s) 106 may include one or more publication management module 218. Each publication management module 218 may be a hardware implemented module, software executed by general purpose or special purpose hardware, or instructions stored on a computer readable medium that is operative to provide crowdsourced content publication administrators with a number of publication management functions. Administrators may be able to designate a particular publication as a reoccurring publication and may specify a frequency at which the publication is published. Administrators may also be able to define one or more access rights associated with a particular publication. Access rights may designate a group of users permitted to view a publication or portion thereof. In some embodiments, the group of users permitted to view the publication is a product of the location of the user. For example, a community leader may create a publication to be published to residents of a particular zip code. In such an example, only the residents of the particular zip code may be able to access and view the resulting crowdsourced content publication. In some embodiments, access rights may be based on physical, given, or earned credentials.

The publication management module 218 may also provide administrators and contributors the ability to verify and approve a populated template prior to the generation of the publication. During the verification and approval process, the publication management module 218 may provide the administrator with a list of contributors with indications of whether each contributor has actually contributed to the publication template and to what extent each contributor has contributed. To this end, the publication management module 218 may track and store the activity and contribution information provided by each of the contributors. The administrator may also select certain contributors to receive notifications related to the contributions of other contributors. These notifications may include previously received contribution information and may allow users to review and edit the contribution information in accordance with the contribution privilege information.

In some embodiments, the administrator may designate a particular crowdsourced content publication to be directed to a particular user or group of users. In such a case, the crowdsourced content publications may be automatically transmitted to the particular user or group of users upon generation or at a specified time. For example, an administrator may create a publication to be directed to the attendees of a particular event. In this example, the administrator could configure the crowdsourced content publication to be automatically published to the attendees at the start of the event.

As illustrated in FIG. 2, the content publication module(s) 106 may include one or more subscription module 220. Each subscription module 220 may be a hardware implemented module, software executed by general purpose or special purpose hardware, or instructions stored on a computer readable medium that is operative to provide users an ability to subscribe to crowdsourced content publications. Users may navigate through a list of existing publications and subscribe to future editions of the publication. Administrators may determine whether particular publications may be subscribed to and may specify these access rights in accordance with the techniques described herein. Users subscribed to a particular publication may automatically be provided with the publication upon creation or at time intervals defined by the user or administrator.

In some embodiments, subscription module 220 may work in conjunction with suggestion module 212 to provide users with a list of crowdsourced content publication that may be of interest to the user. The subscription suggestions may, for example, be based on the member profile data of the user, the social graph of the user, the behavior data of the user or any other attribute of the user.

Methods

Figure 3:
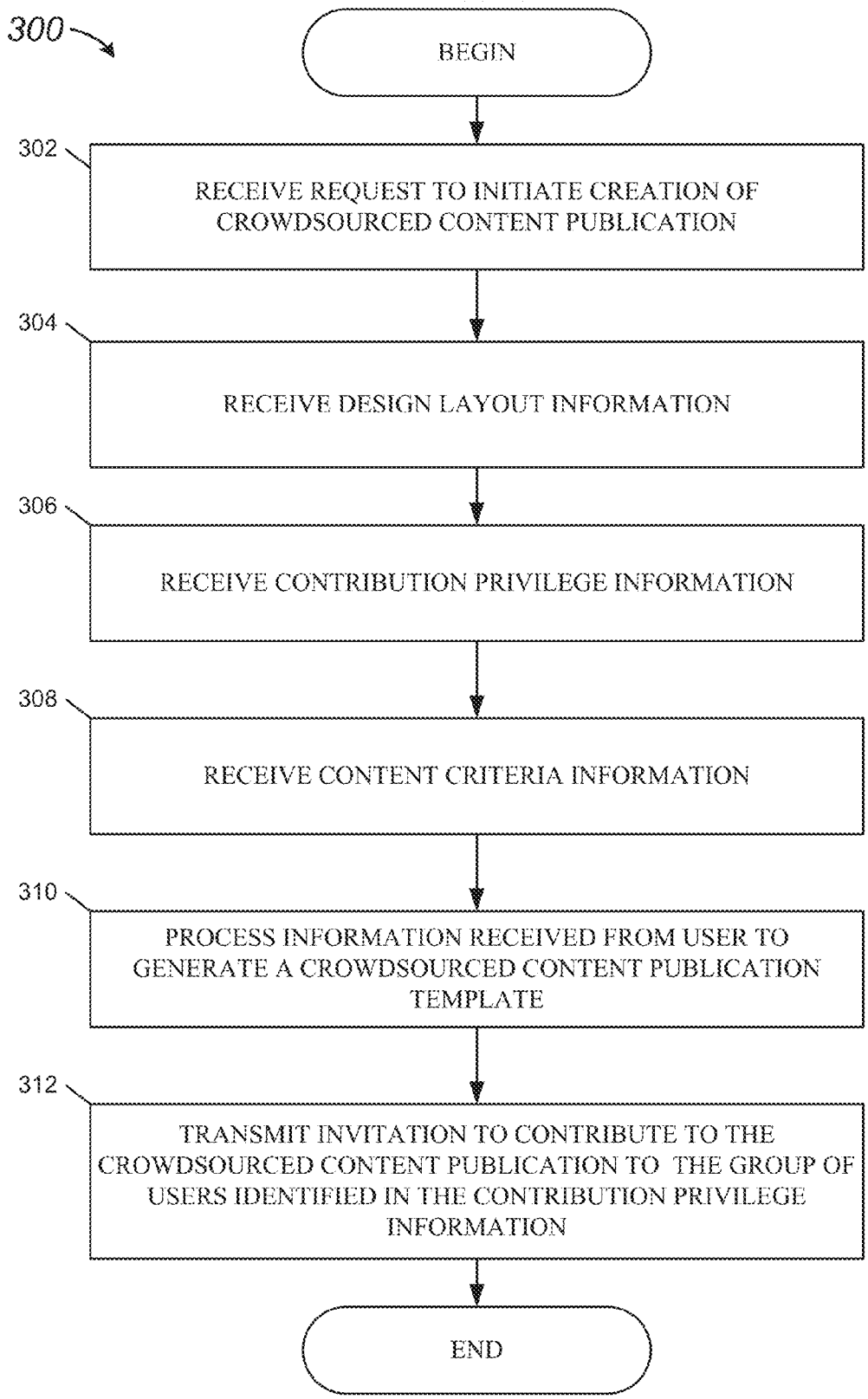
FIG. 3 is a flow chart illustrating a method of initializing the creation of a crowdsourced content publication, according to an example embodiment.

FIG. 3 is a flow chart illustrating a method 300 of initializing the creation of a crowdsourced content publication, according to an example embodiment. At operation 302, a request is received to initiate the creation of a crowdsourced content publication. The request may be received through a user interface of a social network or via an API as part of a service offered by a third party application. For purposes of the present disclosure, the user requesting the initiation of a crowdsourced content publication may be referred as the administrator of the crowdsourced content publication.

At operation 304, design layout information is received from the administrator of the crowdsourced content publication. The design layout information may dictate the layout, number and size of content frames on a particular page. The design layout information may also dictate the organization of pages or sections into topics, the organization of pages or topics into sections, and the order of each page, section or topic.

At operation 306, contribution privilege information is received from the administrator of the crowdsourced content publication. The contribution privilege information may designate certain users that are members of the social networking service hosting the content publication module(s) 106 as contributors. The contribution privilege information may include contribution privileges for each contributor that may further specify the manner in which each contributor can contribute (e.g., add content, edit content view content, rate content, etc.) to the crowdsourced content publication.

At operation 308, content criteria information is received from the administrator of the crowdsourced content publication. The content criteria may identify one or more sources from which content may be added to the crowdsourced content publication. Each content frame, page, section or topic may have associated content criteria.

At operation 310, the received layout information, contribution privilege information, and content criteria may be processed to generate a template for the crowdsourced content publication. Depending on the layout information, the template may be rendered with a plurality of empty content frames, prepopulated content frames, or combinations thereof. The template may be rendered in a format that may be viewed on a web browser or specialized application running on a client device of each of the contributors. Upon rendering the template, the crowdsourced content publication administrator may be presented with the option to audit, verify, and approve each aspect of the template before the template is released for contribution to the designated contributors. During the approval process, the administrator may modify content, placement of content, or layout of content. Although other users may not modify content during this time, these users may still be able to interact with content during this process through likes, comments, shares and any other such social network actions in accordance with the contribution privileges.

At operation 312, an invitation to contribute to the crowdsourced content publication is transmitted to each of the contributors designated by the contribution privilege information. The invitation may include a uniform resource locator (URL) or a hyperlink to direct the browser or application to the template for the crowdsourced content publication. The invitation may also enable the contributors to identify additional users who may be of assistance in creating the publication. Depending on the information used to generate the template (e.g., layout information), the invitation may also contain a prompt for the user to contribute content to the template. For example, the invitation may prompt each contributor to enter text in response to the inquiry "What is our company's culture to you?" or "What was your favourite experience of your senior year?".

Figure 4:
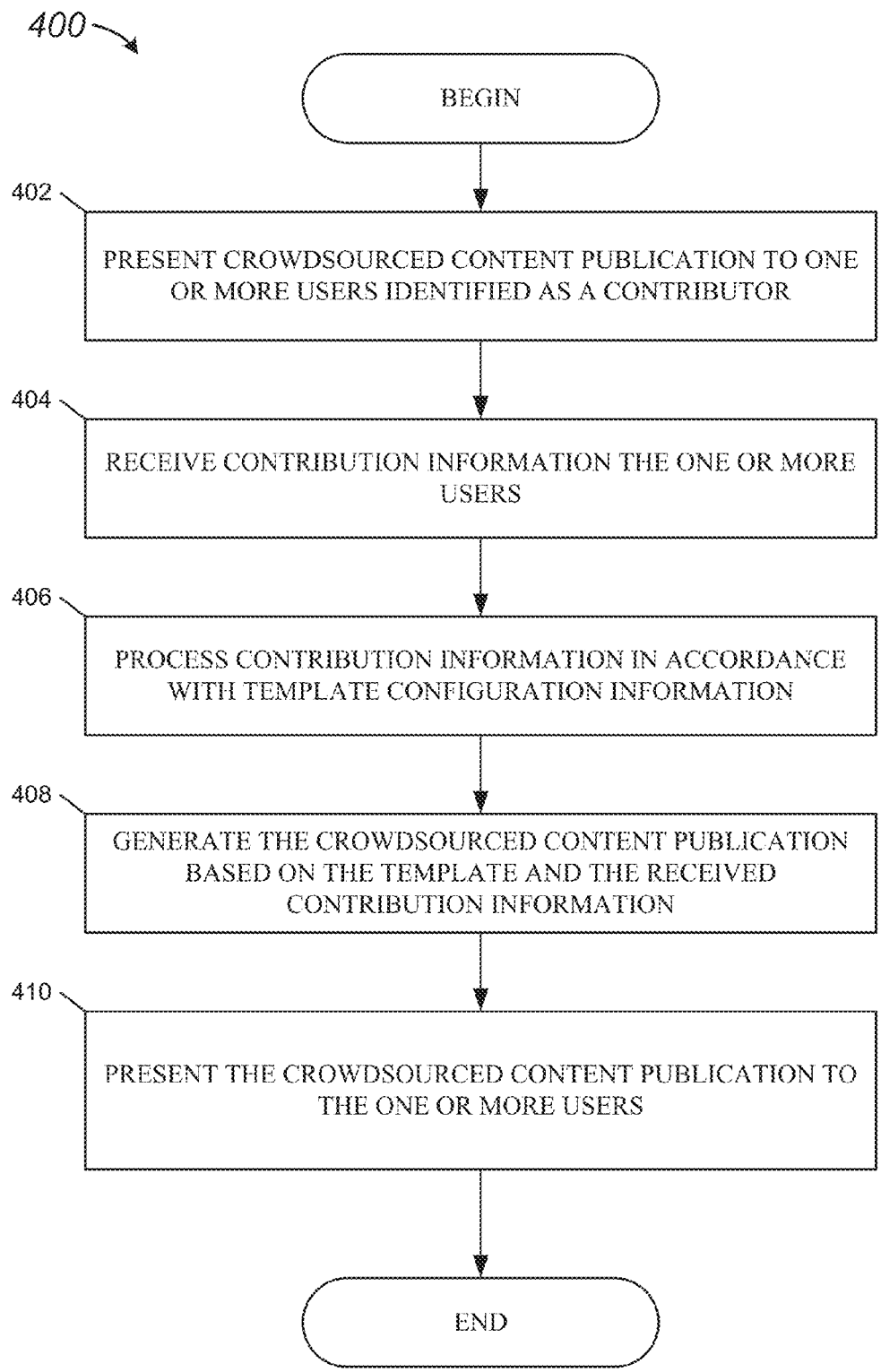
FIG. 4 is a flow chart illustrating a method of creating a crowdsourced content publication, according to an example embodiment.

FIG. 4 is a flow chart illustrating a method 400 of creating a crowdsourced content publication, according to an example embodiment. At operation 402, a template of the crowdsourced content publication is presented to one or more users identified in the contribution privilege information as a contributor. In some embodiments, the template may be generated by the generation module 214. In other embodiments, the template is received from a third party service. In some embodiments, the template may be presented to the user in an invitation such as invitation discussed in reference to operation 312 of FIG. 3. In some embodiments, the template may be presented to a contributor in response to the contributor suggesting that particular content be included in the crowdsourced content publication. In some embodiments, the contributor may be presented the template in response to the user accessing a content publication service provided by a social network.

At operation 404, contribution information is received from the contributors. The type of contribution information received from each of the one or more contributors may depend on the content criteria. For example, depending on the content criteria, the contribution information may be in the form of content generated by the contributor or content from a source identified by the content criteria. In some embodiments, the contribution information may be a rating of existing content previously added to the template by another contributor or automatically prepopulated during the generation of the template. In some embodiments, the contribution information may be an edit to existing content previously added to the template by another contributor or automatically prepopulated during the generation of the template. In some embodiments, the contribution information may be a tagging or linking of another user to existing content previously added to the template by another contributor. Contribution information may also include metadata for content such as location, date, event information, or the like. Contribution information may also take the form of discussion of topics, chapters or sections by designated contributors. These discussions may be to all users or limited to contributors depending on the contribution privilege information established by the crowdsourced content publication administrator.

At operation 406, the contribution information is processed in accordance with the template configuration information. The processing of the contribution information may include verifying that the type of contribution information provided by each contributor is consistent with the contribution privileges assigned to each contributor. In some embodiments, the processing of the contribution information may also include verifying that the contribution information fulfils the content criteria.

Depending on the type of contribution information received, additional operations may be included in the processing of the contribution information. For example, if the contribution information is a rating of content, then the processing of the contribution information may include determining an overall rating of content. In another example, if the contribution information relates to an edit to existing content, then the processing of the contribution information may include performing an edit to the content existing in the template. In yet another example, if the contribution information includes a tagging or linking of additional users to existing content, then the processing of the contribution information may include verifying the additional users and transmitting an invitation to contribute to the additional users. In still another example, if the contribution information involves the addition of content to the template, then the processing of the contribution information may include adding additional content to the template.

At operation 408, the crowdsourced content publication is generated based on the template and the processed contribution information. The crowdsourced content publication may be generated in an electronic format that may be presented by a web browser or specialized application running on a client device at operation 410. In some embodiments, users may be able to download the crowdsourced content publication in the electronic format as a file that can be viewed using software installed locally on the client machine of the user. In some embodiments, the crowdsourced content publication is generated in a format to be presented as a physical print version at operation 410.

Figure 5:
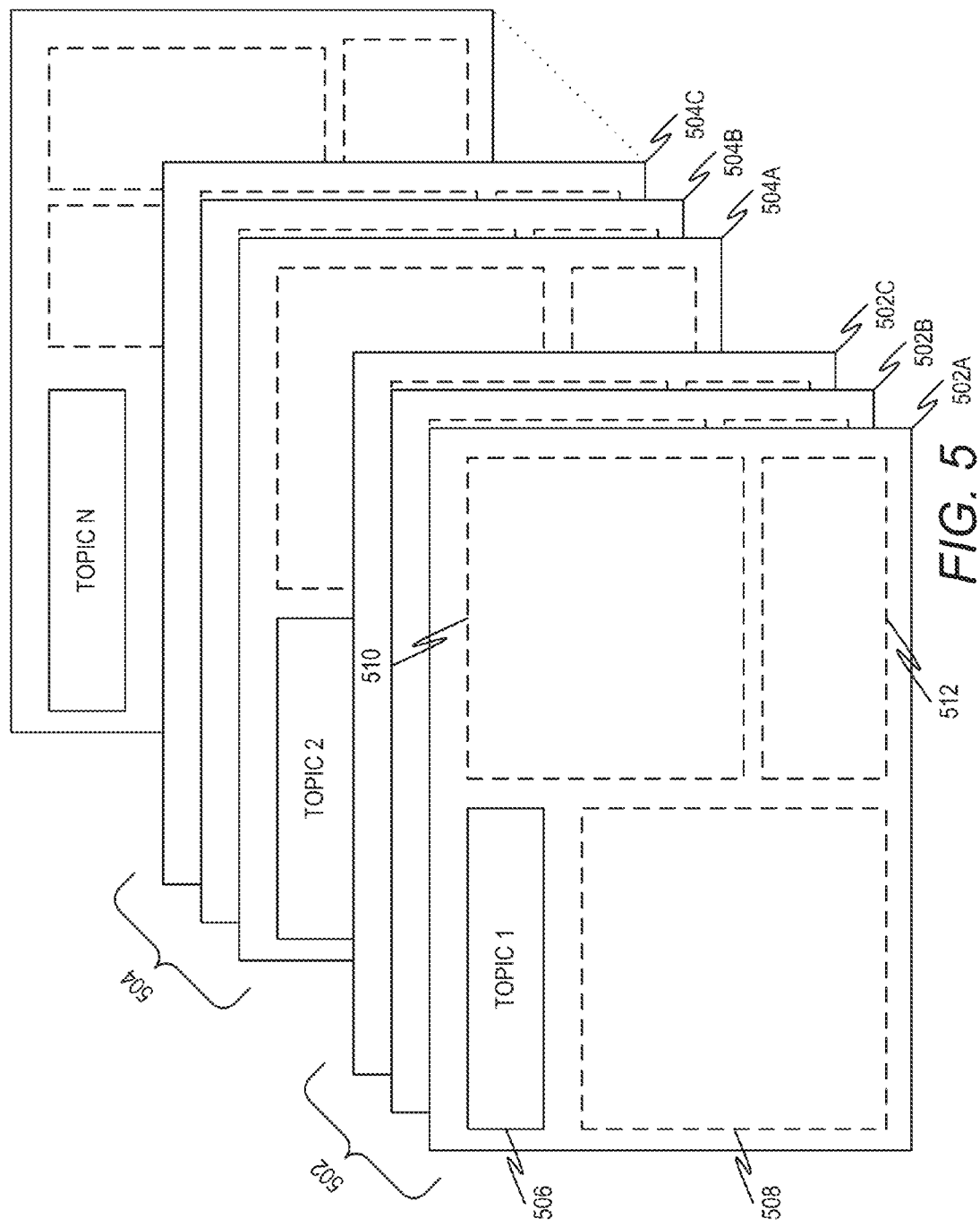
FIG. 5 is a block diagram illustrating an abstract view of the organization of a template for a crowdsourced content publication, according to an example embodiment.

FIG. 5 is a block diagram illustrating an abstract view of the organization of a template 500 for a crowdsourced content publication, according to an example embodiment. The template 500, along with other content and information received from one or more contributors, serves as a basis for the eventual crowdsourced content publication. A template for a crowdsourced content publication, such as the template illustrated in FIG. 5, may be generated upon receiving a request from a user to initiate the creation of a crowdsourced content publication. The user initiating the creation of the publication, also referred to as the administrator, may, during the creation of the template, specify various aspects of the configuration of the template and in turn the configuration of the crowdsourced content publication generated based on the template.

For example, as illustrated in FIG. 5, the crowdsourced content publication may be organized into one or more sections, such as sections 502 and 504. Each of the sections 502 and 504 may be comprised of one or more pages 502A, 502B, and 502C, and pages 504A, 504B, and 504C, respectively. The number and order of the pages 502A, 502B, 502C, 504A, 504B and 504C may be specified in layout information received from the crowdsourced content administrator. The layout information may likewise specify the organization of pages 502A, 502B, 502C, 504A, 504B and 504C into sections 502 and 504, respectively.

Although crowdsourced content publication template 500 is illustrated in FIG. 5 as having two sections with each section having three pages, it should be appreciated that in other embodiments a crowdsourced content publication template (and eventual publication) may have any number of sections with each section having any number of pages. Further, it should be appreciated that the crowdsourced content publication need not be organized by section and may instead be comprised of a plurality of pages.

As illustrated in FIG. 5, each section (e.g., sections 502 and 504) is illustrated to be organized by topic (e.g., "Topic 1," "Topic 2," etc.). However, it should be appreciated that, in other embodiments, each page may be organized according to topic. Further, in other embodiments, the crowdsourced content publication may not be organized according to topic. By way of non-limiting example, a topic may be an event, a date or time, a season, a holiday, a club or organization, or any other subject of interest. The organization of the crowdsourced content publication by topic may also be specified on the layout information.

Each page of a generated crowdsourced content publication may have a number of different content elements. As such, during the creation of a crowdsourced content publication, a number of content frames may be added to the template to serve as placeholders for the eventual content that will be added to the publication. As such, page 502A of the crowdsourced content publication template 500 is illustrated to include content frames 506-512. Throughout the creation process, content elements may be added to empty content frames and eventually incorporated into the generated publication in accordance with the template configuration information.

Although not illustrated in FIG. 5, each page of the crowdsourced content publication template 500 may have any number of content frames 506-512 each having an individualized layout, shape and size of content frames. The layout, size and shape of each of the content frames 506-512 may be specified in layout information received from the crowdsourced content publication administrator.

The administrator of the crowdsourced content publication may also designate one or more members of the social network as contributors to contribute to the crowdsourced content publication. The contribution privileges of each contributor, as specified by the contribution information, may be on a per content frame basis (e.g., "Contributor A" may only contribute to content frame 510), a per page basis (e.g., "Contributor B" may only contribute to pages 502B, and 504C), a per section basis (e.g., "Contributor C" may only contribute to section 504), or, if applicable, a per topic basis (e.g., "Contributor D" may only contribute to "Topic 1").

In some embodiments, the source, type and other criteria for content added to be added to each of the content frames 506-512 may be specified in content criteria received from the administrator. As with contribution privileges, the content criteria may be designated on a per-content frame basis, a per page basis, a per section basis, or a per topic basis.

User Interfaces

Figure 6:
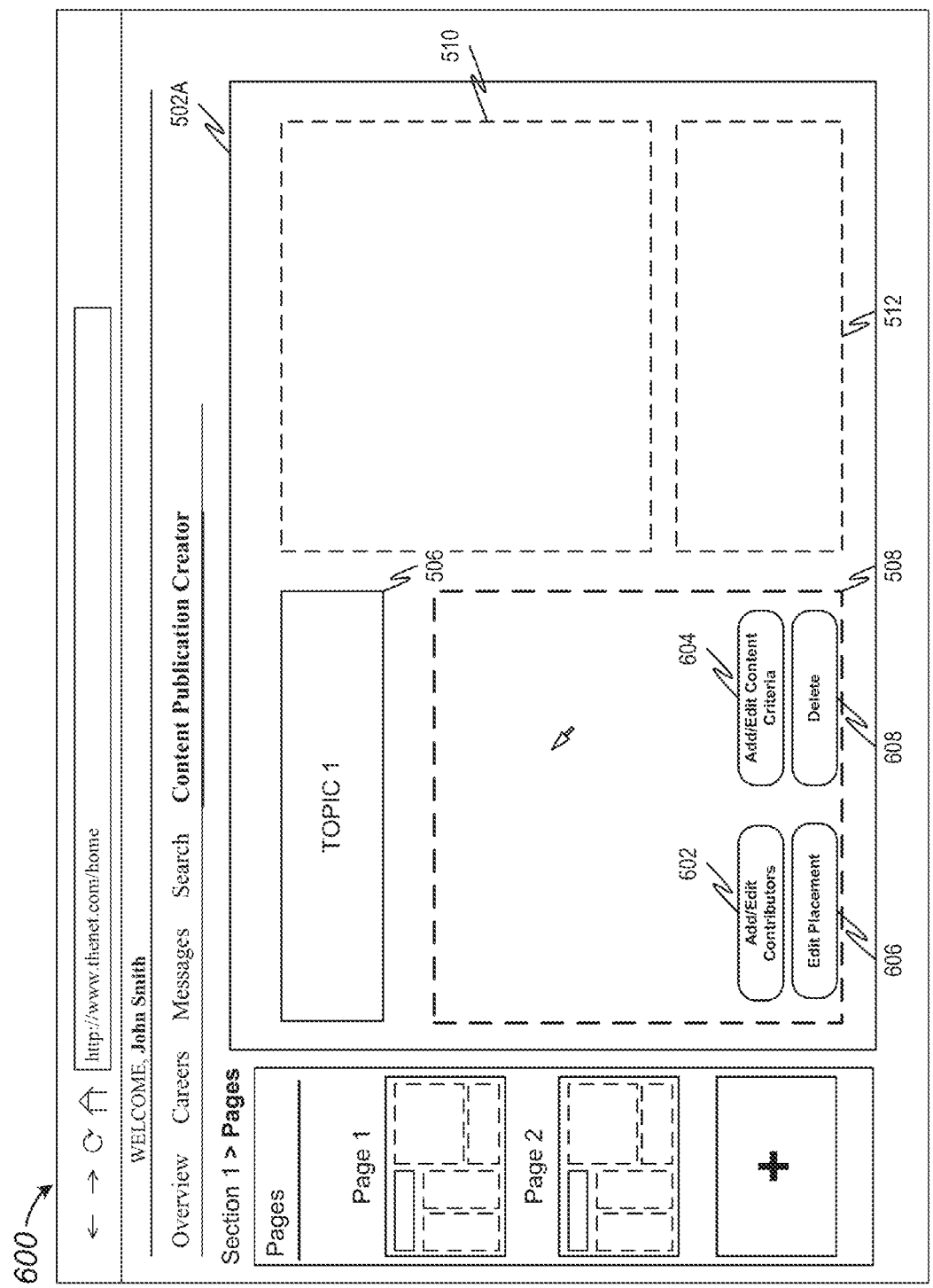
FIG. 6 is an interface diagram illustrating a portion of a user display module for creating a crowdsourced content publication, according to an example embodiment.

FIG. 6 is an interface diagram illustrating a portion of a user display module 600 for creating a crowdsourced content publication, according to an example embodiment. The user display module 600 may be presented to a user upon receiving a request to initiate the creation of a crowdsourced content publication. The user display module 600 is illustrated to include a view of the template 500 (as discussed in reference to FIG. 5), and more specifically a view of page 502A.

As illustrated in FIG. 6, upon positioning a mouse cursor over content frame 508, the user may be presented with buttons 602-608. Each of the buttons 602-608 provides the user with an ability to perform an action with respect to content frame 508. For example, selection of button 602 may cause a window to appear that may allow the user to designate a particular user or group of users as a contributor to content frame 508 as well as the content privileges associated with that user or group of users that dictates the manner in which each contributor may contribute. Similarly, selection of button 604 may cause a window to appear that may allow the user to designate one or more criteria associated with the content that may be added to content frame 508.

Selection of button 606 may cause content frame 508 to become detached from its current location and able to be moved to another desired location within page 502A, or any other location within the template 500. If content frame 508 is moved to a new position, the layout information for template 500 may be updated accordingly. Selection of button 608 may cause content frame 508 to be removed from page 502A and the layout information to be updated accordingly.

Figure 7:
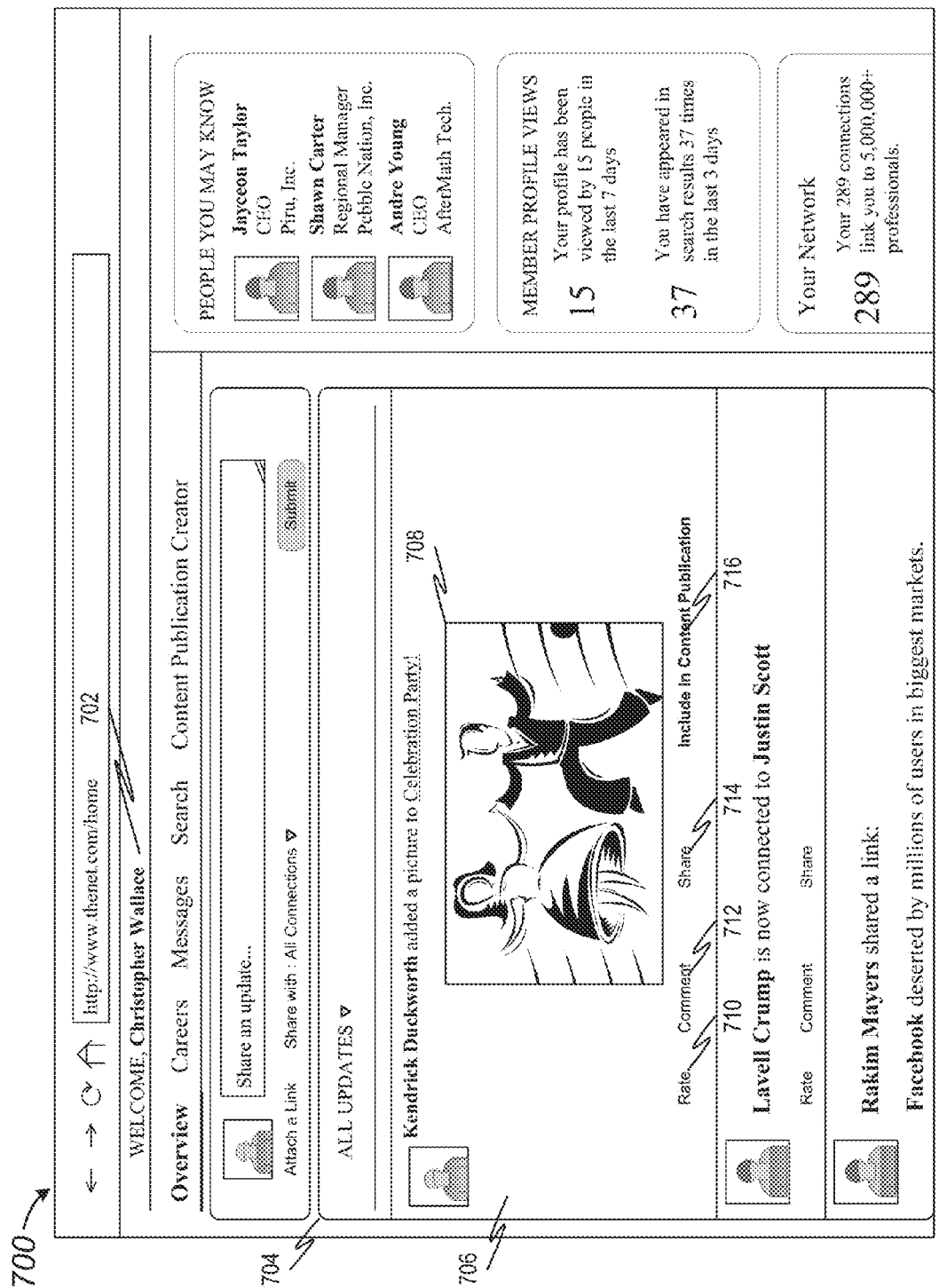
FIG. 7 is an interface diagram illustrating a portion of a display including an activity feed presented as part of a social network service, according to an example embodiment.

FIG. 7 is an interface diagram illustrating a portion of a user display 700 including an activity feed presented as part of a social network service, according to an example embodiment. As illustrated by FIG. 7, the activity feed 704 corresponds to user 702. The user 702 may be a contributor as designated as by the contribution privilege information of template 500. The activity feed 704 may be a service provided as part of a social network and may provide users of the social network with frequently updated content and activities. The activity feed 704 may include multiple items informing the user 702 of recent activity of, or content shared by, connections of the user 702. In particular, the activity feed 704 illustrated in FIG. 7 includes item 706, which indicates that a connection of the user 702 has recently added an image 708 to an album that may be visible to the user 702. The social network may provide the user the option to "Rate," "Comment," or "Share" the image 708 by clicking on buttons 710, 712, and 714, respectively. In addition, because the user 702 is a designated contributor to template 500, the user 702 may be provided with the additional option to include the image 708 in the template 500 by clicking button 716. In some embodiments, the image 708 may be automatically added to the crowdsourced content publication template 500 upon the user clicking button 716.

Consistent with some embodiments, the item 706 may be surfaced on the activity feed 704 of the user 702 based in part on the user 702 being granted contribution privileges to the template 500. The surfacing of the item 706 onto the activity feed 704 may also be based on the image 708 (included in item 706) fulfilling certain criteria set forth in the content criteria information associated with the template 500. For example, the content criteria information associated with the template 500 may indicate that, for a particular frame, section or page, only content from a particular album (e.g., the "Celebration Party Album") may be included.

Figure 8:
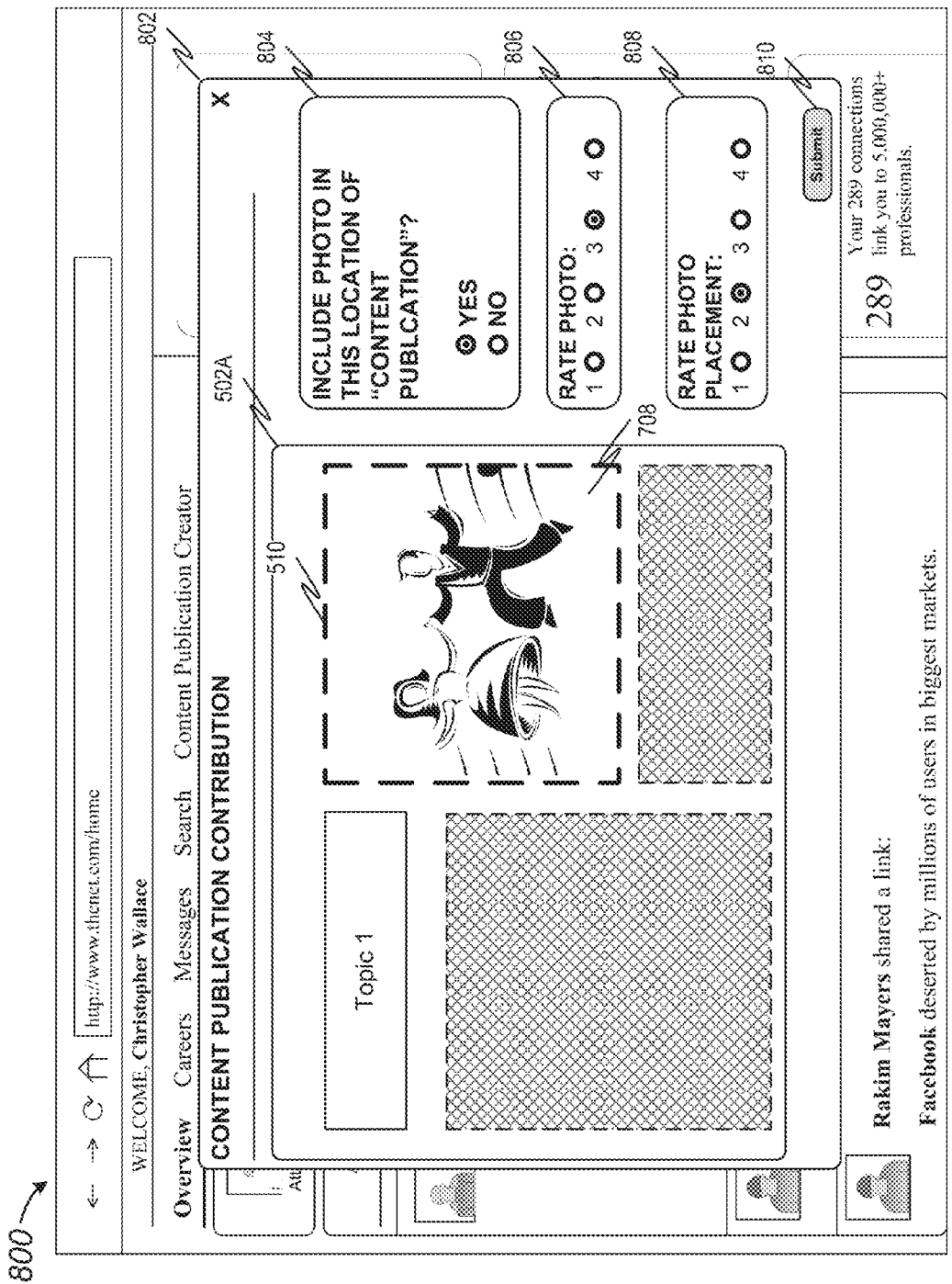
FIG. 8 is an interface diagram illustrating a portion of a display including a user interface for receiving contribution information from a user, according to an example embodiment.

FIG. 8 is an interface diagram illustrating a portion of a user display 800 including a user interface 802 for receiving contribution information from user 702, according to an example embodiment. The user interface 802 may be presented to the user 702 in response to the user clicking button 716 (illustrated in FIG. 7). The user interface 802 may include contribution boxes 804-808, which may enable the user 702 to contribute content to the template 500.

Contribution box 804 may provide the user 702 the ability to include image 708 in the template 500. Contribution box 806 may provide the user 702 to the ability to rate the image 708. Contribution box 808 may allow the user 702 to rate the placement of the image 708. In particular, the user 702 may rate the placement of image 708 into content frame 510. The content rating schemes provided as part of contribution boxes 804-808 are for illustrative purposes and are meant to be a non-limiting example. In other embodiments, these rating schemes may take the form of traditional rating schemes employed by social networks (e.g., "Like" button, upvoting or downvoting, etc.) or elsewhere.

The contribution information entered by the user in each of the contribution boxes 804-808 may be transmitted to the content publication module(s) 106 upon selection of button 810. It should be appreciated that in other embodiments and depending on the contribution privilege information of the publication, a contributor may be provided with fewer contribution boxes than illustrated or additional contribution boxes that are not illustrated. Consistent with some embodiments, the received contribution information from contribution boxes 804-808 may be used to generate the crowdsourced content publication consistent with techniques described herein.

Figure 9:
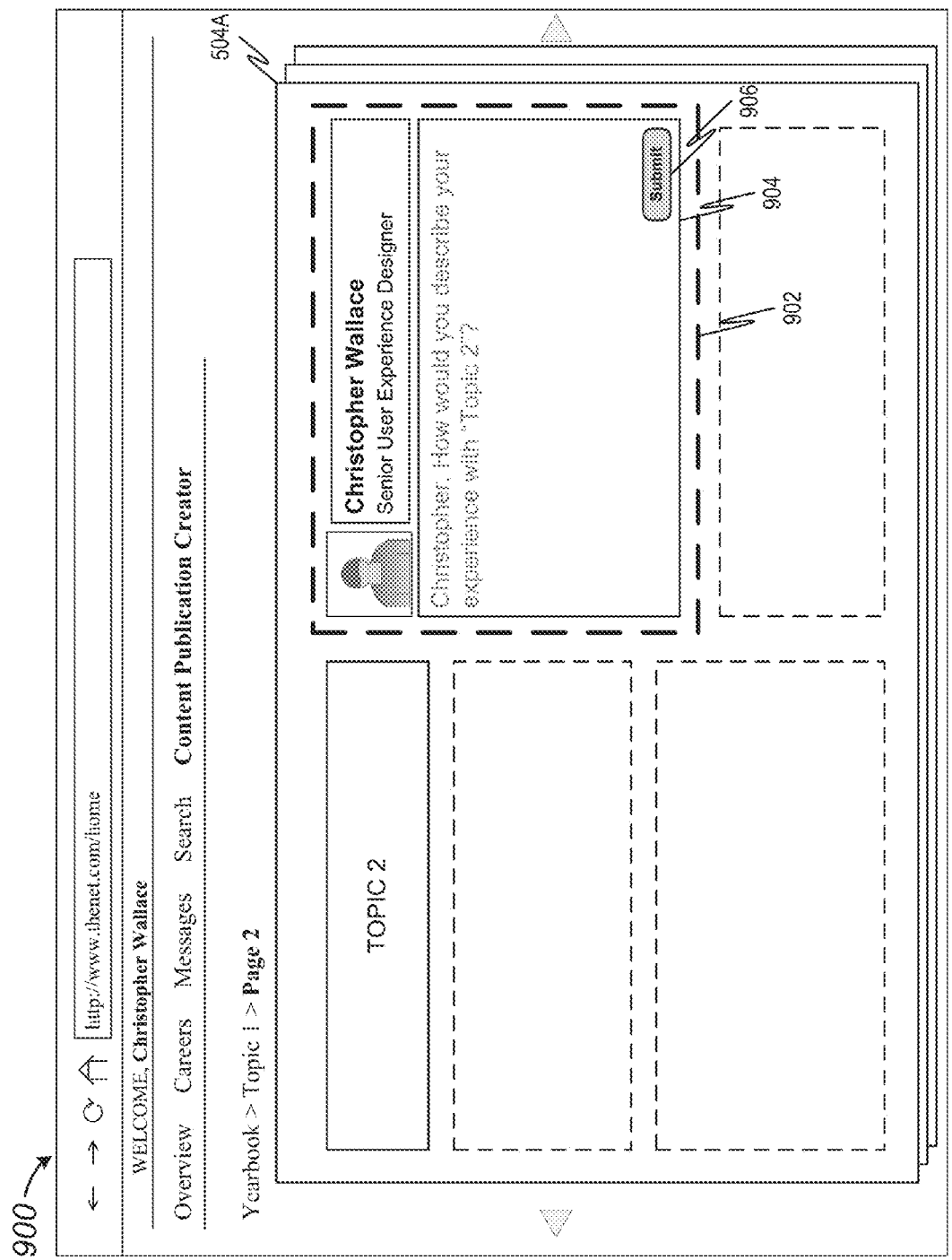
FIG. 9 is an interface diagram illustrating a portion of a display including a user interface of the content publication application, according to an example embodiment.

FIG. 9 is an interface diagram illustrating a portion of a display including a user interface 900 of content publication module(s) 106, according to an example embodiment. As illustrated in FIG. 9, the user interface 900 includes page 504A of crowdsourced content publication template 500.

Consistent with embodiments described herein, the page 504A may be organized by the publication administrator to include multiple content frames.

In some embodiments, each of the content frames may have associated content criteria for content to be included in the frame as well as associated contribution privilege information designating one or more user that may contribute content to the content frame. The content criteria and contribution privilege information associated with content frame 902, for example, may indicate that user 702 may contribute content generated by the user 702. Specifically, as illustrated in FIG. 9, the user 702 may contribute text based content generated in response to the inquiry "How would you describe your experience with Topic 2?" The user 702 may enter text in dialog box 904 that may be included in the subsequently generated publication in content frame 902. In some embodiments, the text entered into dialog box 904 may be automatically added to content frame 902 of page 504A of the crowdsourced content publication template 500 upon the user clicking button 906.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 10:
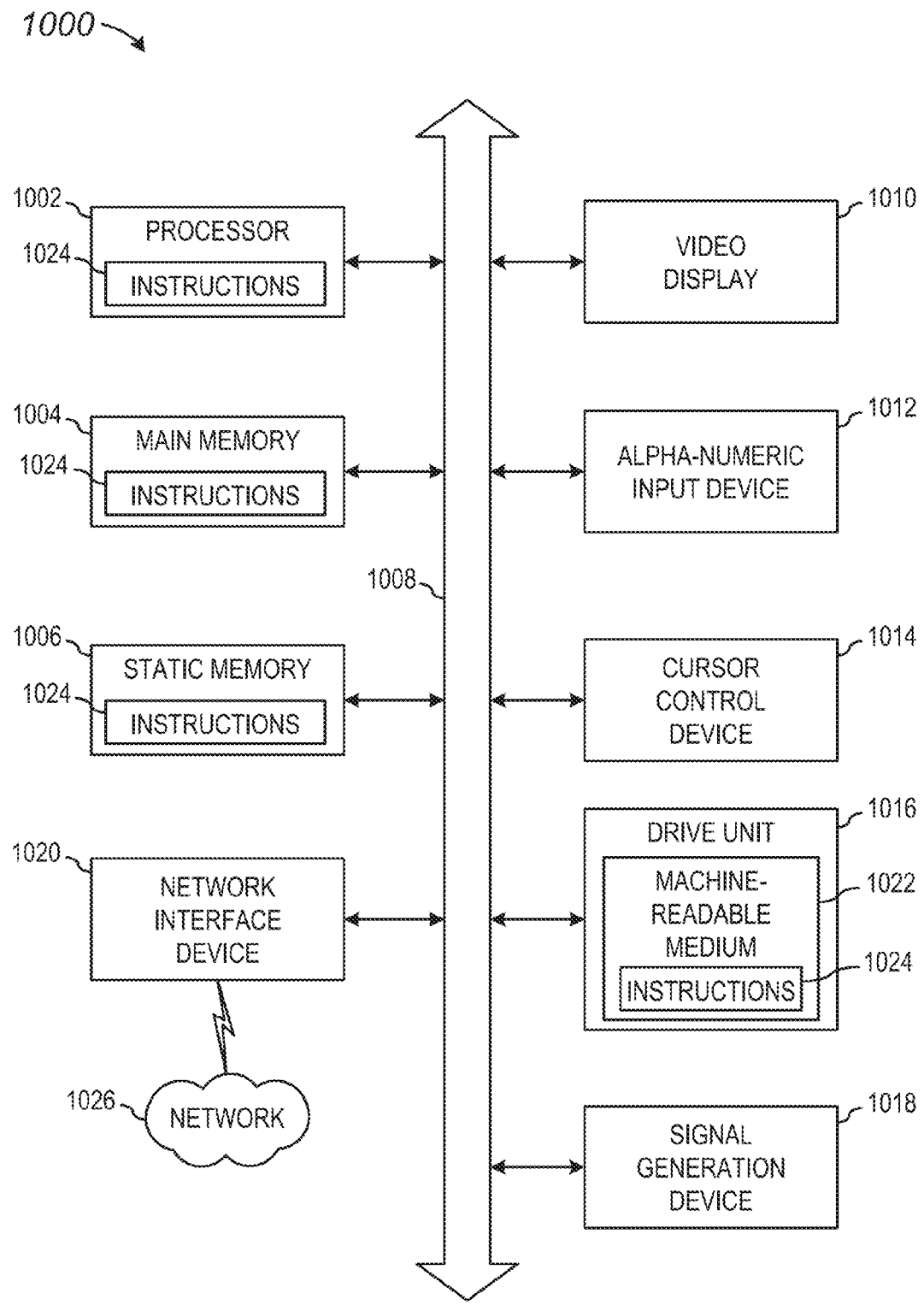
FIG. 10 is a block diagram of machine in the example form of a computer system within which a set instructions may be executed for causing the machine to perform any one or more of the methodologies discussed herein.

FIG. 10 is a block diagram of machine in the example form of a computer system 1000 within which instructions 1024 may be executed for causing the machine to perform any one or more of the methodologies discussed herein. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding or carrying instructions (e.g., instructions 1024) for execution by the machine and that cause the machine to perform any one or more of the methodologies of the present inventive subject matter, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
generating a template for a publication, the template including a plurality of content frames, a portion of the plurality of content frames being prepopulated with content, the remainder of the plurality of content frames providing an empty placeholder for populating content;
receiving a content item from a first user of a group of users designated as contributors to the publication;
receiving, from a second user of the group of users designated as contributors to the publication, rating information comprising a first rating for the content item and a second rating for a placement of the content item within a particular content frame from among the remainder of the plurality of content frames; and
generating the publication using the template and the received content item, the generating of the publication including determining placement of the content item in one of the remainder of the plurality of content frames based on the first and second ratings received from the second user.

2. The method of claim 1, further comprising providing a user interface configured to receive contribution information from the group of users designated as contributors to the publication, the user interface including a presentation of the template for the publication.

3. The method of claim 1, further comprising transmitting an invitation to contribute to the publication to each member of the group of users, wherein the invitation provides each member of the group of users an ability to view and edit the template in accordance with contribution privilege information associated with the template.

4. The method of claim 1, wherein the group of users designated as contributors to the publication is defined by contribution privilege information associated with the template, the contribution privilege information specifying a manner in which each member of the group of users may contribute to each element of the publication.

5. The method of claim 2, wherein:
the contribution information includes the rating information; and
the presentation of the template for the publication includes a presentation of the content item within the particular content frame from among the remainder of the plurality of content frames of template for the publication.

6. The method of claim 1, further comprising calculating an overall rating for the content item based on the first and second ratings received from the second user and a plurality of additional ratings received from additional users of the group of users, wherein the placement of the content item is based on the overall rating.

7. The method of claim 1, wherein the group of users identified as contributors belong to a common organization as defined by a social graph maintained by the social networking service.

8. The method of claim 1, further comprising transmitting, in response to receiving the content item, a notification to at least one other user in the group of users, the notification including a display of the content item, the notification providing an ability to edit the content item in accordance with contribution privilege information associated with the template.

9. The method of claim 1, wherein the template includes content criteria information specifying one or more criteria for selection of content for inclusion in each element of the publication.

10. The method of claim 1, further comprising:
receiving an identifier of a third user linked to the content item; and
transmitting, to the third user, an invitation to contribute to the publication based on the third user being linked to the content item.

11. A system comprising:
a processor of a machine;
a template generation module configured to generate, using the processor of the machine, a template for a publication, the template including a plurality of content frames, a portion of the plurality of content frames being prepopulated with content, the remainder of the plurality of content frames providing an empty placeholder for populating content;
a user interface module configured to receive a content item from a first user of a group of users designated as contributors to the publication the user interface module further configured to receive, from a second user of the group of users designated as contributors to the publication, rating information comprising a first rating for the content item and a second rating for a placement of the content item within a particular content frame from among the remainder of the plurality of content frames; and
a generation module configured to generate the publication using the template and the received content item, the generating of the publication including determining placement of the content item in one of the remainder of the plurality of content frames based on the first and second ratings received from the second user.

12. The system of claim 11, wherein the user interface module is further to provide a user interface configured to receive contribution information from the group of users designated as contributors to the publication, the user interface including a presentation of the template for the publication.

13. The system of claim 11, wherein the user interface module is further to transmit an invitation to contribute to the publication to each member of the group of users, wherein the invitation provides each member of the group of users an ability to view and edit the template in accordance with contribution privilege information associated with the template.

14. The system of claim 11, wherein the group of users designated as contributors to the publication is defined by contribution privilege information associated with the template, the contribution privilege information specifying a manner in which each member of the group of users may contribute to each element of the publication.

15. The system of claim 11, wherein the publication commemorates a shared experience of a group of users connected on a social graph.

16. The system of claim 11, wherein the user interface module is further to transmit, in response to receiving the content item, a notification to at least one other user in the group of users, the notification including a display of the content item, the notification providing an ability to edit the content item in accordance with contribution privilege information associated with the template.

17. The system of claim 11, wherein the template includes content criteria information specifying one or more criteria for selection of content for inclusion in each element of the crowdsourced content publication.

18. The system of claim 12, wherein:
the contribution information includes the rating information; and
the presentation of the template for the publication includes a presentation of the content item within the particular content frame from among the remainder of the plurality of content frames of template for the publication.

19. The system of claim 11, wherein the group of users identified as contributors belong to a common organization as defined by a social graph maintained by the social networking service.

20. A non-transitory machine-readable storage medium embodying instructions that, when executed by a machine, cause the machine to perform operations comprising:
generating a template for a publication, the template including a plurality of content frames, a portion of the plurality of content frames being prepopulated with content, the remainder of the plurality of content frames providing an empty placeholder for populating content;
receiving a content item from a first user of a group of users designated as contributors to the publication;
receiving, from a second user of the group of users designated as contributors to the publication, rating information comprising a first rating for the content item and a second rating for a placement of the content item within a particular content frame from among the remainder of the plurality of content frames; and
generating the publication using the template and the received content item, the generating of the publication including determining placement of the content item in one of the remainder of the plurality of content frames based on the first and second ratings received from the second user.

* * * * *

UNITED STATES PATENT AND TRADEMARK OFFICE
CERTIFICATE OF CORRECTION

PATENT NO. : 9,781,178 B2
APPLICATION NO. : 14/791040
DATED : October 3, 2017
INVENTOR(S) : Dave et al.

Page 1 of 1

It is certified that error appears in the above-identified patent and that said Letters Patent is hereby corrected as shown below:

In the Claims

In Column 22, Line 35, in Claim 11, delete "publication" and insert --publication,-- therefor Signed and Sealed this
Ninth Day of July, 2019

Andrei Iancu
*Director of the United States Patent and Trademark Office*